(12) United States Patent
Irwin

(10) Patent No.: US 6,283,885 B1
(45) Date of Patent: Sep. 4, 2001

(54) PRESSURE RELIEF CHECK VALVE ARRANGEMENT FOR DIFFERENTIAL ASSEMBLY

(76) Inventor: Earl James Irwin, 12409 Burning Tree Rd., Ft. Wayne, IN (US) 46845

(*) Notice: Subject to any disclaimer, the term of this patent is extended or adjusted under 35 U.S.C. 154(b) by 0 days.

(21) Appl. No.: 09/480,890

(22) Filed: Jan. 11, 2000

(51) Int. Cl.[7] .................................................. F16H 48/22
(52) U.S. Cl. ............................................................. 475/88
(58) Field of Search ................................ 475/86, 88, 231, 475/249; 192/35, 85 AA, 103 F

(56) References Cited

U.S. PATENT DOCUMENTS

| | | | |
|---|---|---|---|
| 2,876,881 | * 3/1959 | Parrett | 192/85 R |
| 3,040,600 | 6/1962 | Mueller . | |
| 3,158,042 | 11/1964 | Saurer . | |
| 3,361,008 | 1/1968 | Fallon . | |
| 3,546,969 | * 12/1970 | Gibson et al. | 475/88 |
| 3,656,870 | 4/1972 | Kusakabe et al. . | |
| 3,831,461 | 8/1974 | Mueller . | |
| 3,894,446 | 7/1975 | Snoy et al. . | |
| 3,987,689 | 10/1976 | Engle . | |
| 4,041,804 | 8/1977 | Clark . | |
| 4,059,026 | 11/1977 | Stritzel . | |
| 4,727,966 | 3/1988 | Hiramatsu et al. . | |
| 5,087,228 | 2/1992 | Johansson . | |
| 5,299,986 | 4/1994 | Fabris et al. . | |
| 5,964,126 | * 10/1999 | Okcuoglu | 74/650 |
| 6,183,387 | * 2/2001 | Yoshioka | 475/88 |

FOREIGN PATENT DOCUMENTS 499048   2/1939   (GB) .

* cited by examiner

*Primary Examiner*—Charles A. Marmor
*Assistant Examiner*—Ankur Parekh
(74) *Attorney, Agent, or Firm*—Liniak, Berenato, Longacre & White

(57) ABSTRACT

A pressure relief check valve for a hydraulically actuated clutch pack or limited slip device in a limited slip differential or torque coupling device. A ball seat is formed on the external surface of the differential case and is connected to a passageway leading to a limited slip device within the differential case to establish fluid communication there between. A ball rests on the valve seat and is retained thereon by a retainer and spring. The retainer is removable secured to the outer surface of the differential case and a coil spring is disposed between the ball and the retainer to bias the ball against the valve seat. When pressure within the differential case or limited slip device exceeds a predetermined pressure, the ball is lifted from the valve seat and fluid passes through the differential case to an exterior within the differential housing. When pressure in the differential case and limited slip device is less than the predetermined pressure, fluid is prevented from passing through the valve.

17 Claims, 1 Drawing Sheet

PRESSURE RELIEF CHECK VALVE ARRANGEMENT FOR DIFFERENTIAL ASSEMBLY

BACKGROUND OF THE INVENTION a) Field of the Invention

This invention relates to a pressure relief check valve arrangement in a limited slip differential or torque coupling device for use with a vehicle drive train, for example, a speed sensitive limited slip differential; and more particularly is directed a pressure relief check valve for a hydraulically actuated clutch pack in such a limited slip device.

b) Background of Related Art

Limited slip differentials, or torque coupling devices are well known in the art. In such limited slip devices, a hydraulically actuated friction clutch pack is actuated to retard relative rotation of at least one of the side gears relative to the differential case. Normally, hydraulic pressure is directly increased in response to an increase in rotational speed differential of the axle gears. One common way to provide the hydraulic pressure is to include an internal pump, or gerotor pump, within the differential case. As hydraulic pressure increases as a result of the increased speed of the pump (increased speed differential between one output shaft and the different case) there is a need to provide a check valve to provide relief from pressure build up in the limited slip device. In other words, once the hydraulic pressure reaches a predetermined level, the check valve relieves that pressure.

One such check valve of the related art is shown in FIG. 4. A ball is simply provided in a ball seat on the external surface of the differential case. The ball seat is in communication with hydraulic fluid of the limiting device. The ball is retained in the seat by a leaf spring secured to the outer surface of the differential case. As hydraulic pressure in the limiting device increased, the ball is forced against the leaf spring. If sufficient pressure exists, the leaf spring opens and fluid is allowed to flow out of the differential case. Otherwise, the valve remains closed. However, while this type of leaf spring ball valve does relieve excessive pressures, it suffers from the drawback that too many variables effect the opening and closing of the valve. During operation of the differential assembly, the related art valve does not predictably open and close consistently as desired.

The need therefore exists for an improved differential relief valve that is simple in design, easy to assembly and opens and closes in a predictable and consistent manner.

SUMMARY OF THE INVENTION

The present invention provides an improved pressure relief check valve for use in a limited slip differential or torque coupling device. A ball seat is formed on the external surface of the differential case and is connected to a passageway leading to a limited slip device within the differential case to establish fluid communication there between. A ball rests on the valve seat and is retained thereon by a retainer and spring. The retainer is removable secured to the outer surface of the differential case and a coil spring is disposed between the ball and the retainer to bias the ball against the valve seat. When pressure within the differential case or limited slip device exceeds a predetermined pressure, the ball is lifted from the valve seat and fluid passes through the differential case to an exterior within the differential housing. When pressure in the differential case and limited slip device is less than the predetermined pressure, fluid is prevented from passing through the valve.

The objects, features and advantages of the present invention are readily apparent from the following detailed description of the best modes for carrying out the invention when taken in connection with the accompanying drawings.

BRIEF DESCRIPTION OF DRAWINGS

FIG. 5 is an enlarged sectional view of the pressure relief valve shown in FIG. 1;

DETAILED DESCRIPTION OF PREFERRED EMBODIMENTS

Figure 1:
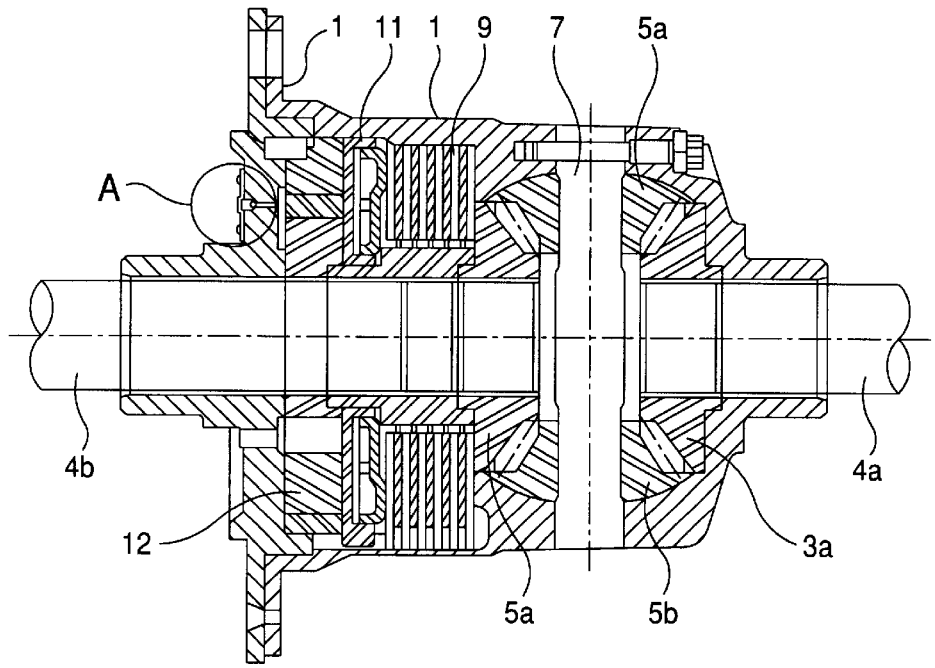
FIG. 1 is a sectional view of a limited slip differential employing the pressure relief valve of the present invention.
Figure 4:
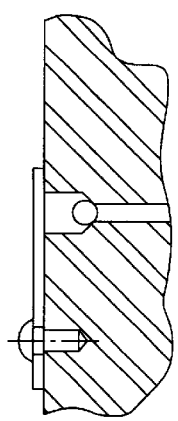
FIG. 4 is a sectional view of a related art pressure relief valve.

FIG. 1 is a cross sectional view of a limited slip differential employing the pressure relief check valve of the present invention. However, it is to be understood that while the present invention is described in relation to a speed sensitive limited slip differential, the present invention is equally suitable for use in torque coupling mechanisms, other hydraulic couplings for a drive-train utilizing a speed sensitive limited slip device. A differential case 1 driven by a ring gear (not shown) houses a pair of side gears 3a, 3b a pair of pinion gears 5a, 5b and a pinion shaft 7 to allow speed differential between a pair of opposite output shafts 4a, 4b as is commonly known in the art. A limited slip device in the form of a clutch pack 9 is disposed between the side gear 3b and the differential case 1. A plurality of friction discs are alternately splined onto the side gear 3b and differential case 1. A hydraulically actuated piston 11 disposed within a piston chamber serves to compress the clutch pack 9 and retard any speed differential between the side gear 3b and differential case 1. This results in a retardation of any speed differential between the shafts 4a, 4b. Preferably a gerotor pump 12 is employed to provide pressurized hydraulic fluid to actuate the piston 11 and engage the clutch pack. In such an arrangement, as the relative speed between the output shafts 4a, 4b increases, the gerotor pump 12 pumps fluid to the piston chamber to actuate the clutch pack. As the speed increases, the pressure increases. In order to relieve pressure build up in the piston chamber, a pressure relief check valve. FIGS. 4 & 5 depict the pressure relief check valves according to the present invention.

Figure 2:
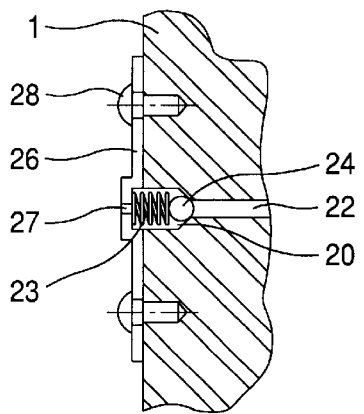

FIG. 2 is an enlarged view of area A of FIG. 1. A valve seat 20 is formed on an external surface of the differential case. The valve seat 20 is in open communication with a passageway 22 that leads to and is in fluid communication with the piston chamber of the limited slip device. A ball 24 is seated on a bottom portion of the valve seat 20. In order to retain the ball 24 within the valve seat 20, a retainer 26 is secured to the external surface of the differential case 1. A coiled spring 23 is disposed between the retainer 26 and the ball 24 to urge the ball 24 against the bottom surface of the valve seat 20. When hydraulic pressure in the passageway 22 (and consequently limited slip device) is above a predetermined pressure, the ball 24 is lifted on the bottom of the valve seat 20 and compresses the coiled spring 23. Such allows fluid to pass through the valve seat 20 and retainer 26 to an exterior of the differential case 1 thereby relieving pressure within the limited slip device. Once the pressure falls below the predetermined value, the spring 23 forces the ball 24 against the bottom of the valve seat 20 to prevent fluid flow through the pressure relief valve. The retainer 26 preferably has a hole 27 extending through the retainer 26 to permit fluid to pass there through. However, the retainer 26 also has a raised portion spaced apart from the differential case 1 to allow fluid to flow past the differential case 1 and around the raised portion. It is noted that the retainer 26 is removably retained to the external surface of the differential case 1 by screws 28. Such an arrangement allows interchanging different springs 23 thereby allowing the predetermined pressure to be altered.

Figure 3:
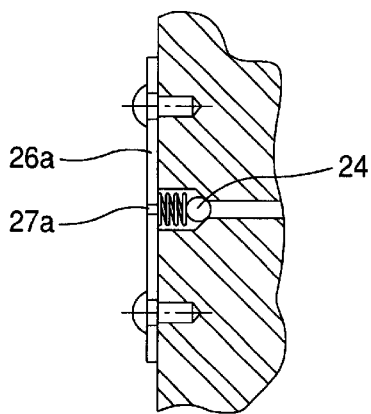
FIG. 3 is an enlarged sectional view of a pressure relief valve according to an alternative embodiment of the present invention.

FIG. 3 depicts another pressure relief check valve according to an alternative embodiment of the present invention. Much like the arrangement of FIG. 2, a ball is provided in a valve seat and is retained by a retainer 20a. A spring is disposed between the retainer 20a and the valve seat to bias the ball against the bottom of the valve seat to prevent fluid flow. However, the retainer 20a is simply made of a rigid flat metal plate removably secured to the external surface of the differential case. A hole is provided to allow fluid to pass through the retainer when the ball is lifted off the valve seat.

The present invention has been shown and described with reference to specific embodiments forming the best mode, however various changes in form and detail may be made without departing from the spirit and scope of the invention. While the best modes for carrying out the invention have been described in detail, those familiar with the art to which this invention relates will recognize various alternatives, designs and embodiments for practicing the present invention as defined by the following claims. For example, the present invention may be used in a direct torque coupling arrangement where speed sensitive coupling between the shafts 4a, and 4b are desired. In such an arrangement, the output shaft 4a is in driving connection with the differential case 11 and the pinion and side gears are removed from within the differential case. When differential rotational speed between the input shaft 4b and differential case 11 exists, the gerotor pump 12 compacts the clutch pack 9 to retard relative rotation between the input shaft 4b and the differential case 11 and consequently between the input shaft 4b and output shaft 4a. In this arrangement alternating friction disc of the clutch pack 9 may be splined directly to the input shaft 4b. The gerotor pump 12 works much the same way as in the differential embodiment. As the input shaft 4b rotates faster than the differential case 11, hydraulic pressure increases and forces the piston 11 against the clutch pack 9 to retard the relative rotation between the differential case 11 and the input shaft 4b. The pressure relief valve arrangement relieves pressure in the limited slip device in precisely the same way as in the differential embodiment disclosed above.

What is claimed is:

1. A pressure relief valve in a differential axle assembly comprising:
    a differential case adapted to be driven by an input shaft, said differential case containing a differential gear assembly to allow differential rotational speed between a pair of opposing output shafts;
    a hydraulically actuated limited slip device disposed within said differential case for retarding said differential rotational speed between said output shafts;
    a pressure relief valve secured to said differential case and in communication with said hydraulically actuated limited slip device to relieve pressure in said limited slip device, said pressure relief valve comprising,
        a ball positioned on a valve seat formed on an external surface of said differential case, said valve seat being in fluid communication with a passage way leading to said limited slip device;
        a retainer disposed over said valve seat and secured to said differential case in a fixed position relative to said differential case, said retainer having an orifice to establish fluid communication between said valve seat and an exterior of said differential case; and
        a spring disposed between said ball and said retainer, wherein, when fluid pressure in said passageway exceeds a predetermined value said ball is lifted from said valve seat to allow fluid to pass through said pressure relief valve to said exterior and when said fluid pressure in said passage way is below said predetermined value said spring maintains said ball against said valve seat to preclude fluid flow between said passageway and said exterior.

2. The pressure relief valve according to claim 1, wherein said spring is a coiled spring.

3. The pressure relief valve according to claim 1, wherein said retainer is detachably secured to an external surface of said differential case.

4. The pressure relief valve according to claim 3, wherein said retainer is screwed to said external surface of said differential case.

5. The pressure relief valve according to claim 1, wherein said opening of said retainer is a hole extending through said retainer between said exterior of said differential case and said valve seat.

6. The pressure relief valve according to claim 1, wherein said retainer is formed of a flat piece of metal.

7. The pressure relief valve according to claim 1, wherein said retainer has a raised portion spaced apart from said external surface of said differential case to allow fluid to pass through said valve seat and around said raised portion to said exterior.

8. The pressure relief valve according to claim 7, wherein said raised portion has a hole extending through said raised portion.

9. A pressure relief valve in a differential axle assembly comprising:
    a differential case adapted to be driven by an input shaft, said differential case containing a differential gear assembly to allow differential rotational speed between a pair of opposing output shafts;
    a pressure relief valve secured to said differential case and in communication with an interior of said differential case, said pressure relief valve comprising,
        a ball positioned on a valve seat formed on an external surface of said differential case, said valve seat being in fluid communication with a passage way leading to said interior of said differential case;
        a retainer disposed over said valve seat and secured to said differential case in a fixed position relative to said differential case, said retainer having an opening to establish fluid communication between said valve seat and an exterior of said differential case; and
        a spring disposed between said ball and said retainer, wherein, when fluid pressure in said passageway exceeds a predetermined value said ball is lifted from said valve seat to allow fluid to pass through said pressure relief valve to said exterior and when said fluid pressure in said passage way is below said predetermined value said spring maintains said ball against said valve seat to preclude fluid flow between said passageway and said exterior.

10. The pressure relief valve according to claim 9, wherein said spring is a coiled spring.

11. The pressure relief valve according to claim 9, wherein said retainer is detachably secured to an external surface of said differential case.

12. The pressure relief valve according to claim 11, wherein said retainer is screwed to said external surface of said differential case.

13. The pressure relief valve according to claim 9, wherein said opening of said retainer is a hole extending through said retainer between said exterior of said differential case and said valve seat.

14. The pressure relief valve according to claim 9, wherein said retainer is formed of a flat piece of metal.

15. The pressure relief valve according to claim 9, wherein said retainer has a raised portion spaced apart from said external surface of said differential case to allow fluid to pass through said valve seat and around said raised portion to said exterior.

16. The pressure relief valve according to claim 15, wherein said raised portion has a hole extending through said raised portion.

17. A pressure relief valve in a torque coupling device between an input and output shaft, said device comprising:
 a differential case in driving connection with said output shaft;
 a hydraulically actuated limited slip device disposed between said differential case and said input shaft to limit differential rotational speed between said input and output shafts;
 a pressure relief valve secured to said differential case and in communication with said hydraulically actuated limited slip device to relieve pressure in said limited slip device, said pressure relief valve comprising,
 a ball positioned on a valve seat formed on an external surface of said differential case, said valve seat being in fluid communication with a passage way leading to said limited slip device;
 a retainer disposed over said valve seat and secured to said differential case in a fixed position relative to said differential case, said retainer having an orifice to establish fluid communication between said valve seat and an exterior of said differential case; and
 a spring disposed between said ball and said retainer, wherein, when fluid pressure in said passageway exceeds a predetermined value said ball is lifted from said valve seat to allow fluid to pass through said pressure relief valve to said exterior and when said fluid pressure in said passage way is below said predetermined value said spring maintains said ball against said valve seat to preclude fluid flow between said passageway and said exterior, wherein said retainer has a raised portion spaced apart from said external surface of said differential case, and said raised portion has said orifice.

\* \* \* \* \*